No. 627,411. Patented June 20, 1899.
J. N. GROVE, Dec'd.
A. GROVE, Administratrix.
TOOL FOR MARKING COGS IN MORTISE WHEELS.
(Application filed Oct. 31, 1898.)
(No Model.)
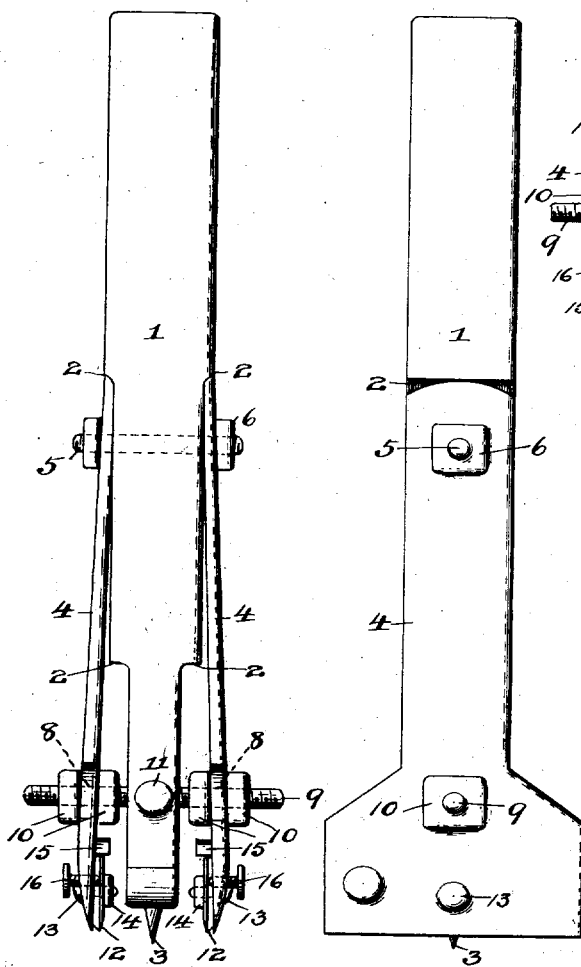
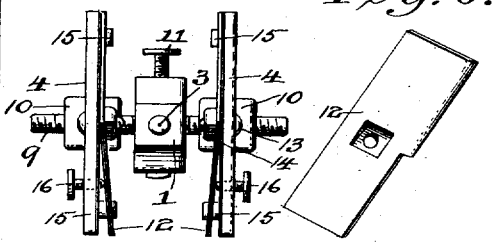
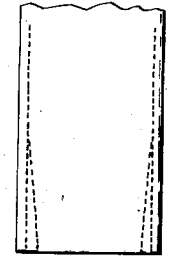
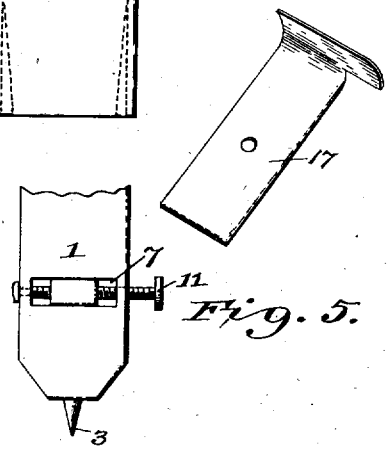
Witnesses
Jos. H. Blackwood
Hartwell P. Neal
Inventor
James N. Grove
by D. A. Gowrick
Attorney

UNITED STATES PATENT OFFICE.

JAMES N. GROVE, OF RAILROAD, PENNSYLVANIA; ANNA GROVE, ADMINISTRATRIX OF SAID JAMES N. GROVE, DECEASED, ASSIGNOR OF ONE-HALF TO WILLIAM G. ALLEN, OF SHREWSBURY, PENNSYLVANIA.

TOOL FOR MARKING COGS IN MORTISE-WHEELS.

SPECIFICATION forming part of Letters Patent No. 627,411, dated June 20, 1899.

Application filed October 31, 1898. Serial No. 695,094. (No model.)

*To all whom it may concern:*

Be it known that I, JAMES N. GROVE, a citizen of the United States, residing at Railroad borough, in the county of York and State of Pennsylvania, have invented a certain new and useful Tool for Making Cogs in Mortise-Wheels, of which the following is a specification.

My invention relates to tools for making cogs in mortise-wheels, and has for its object to provide a strong, simple, durable, and cheaply and easily constructed tool with which the cogs for mortise-wheels may be accurately, readily, and quickly marked mechanically and much time, labor, trouble, and chance of error saved. This object I accomplish in the manner and by the means hereinafter more fully described in detail, and particularly pointed out in the claims, reference being had to the accompanying drawings, in which like figures represent like parts in all the views.

Figure 1 is a front elevation of my invention. Fig. 2 is a side elevation of same. Fig. 3 is a bottom plan view of same. Fig. 4 is a plan view of marked cog. Figs. 5, 6, and 7 are detail views of lower part stock and small blades.

My invention consists of a stock 1, of rectangular shape and suitable length, which has on each side two rounded shoulders 2, where said stock 1 is reduced in thickness, and the end of said stock 1 is beveled on the sides. In the smaller end of the stock 1 a pin 3, reduced to a point at the end, is fixed. A tool 4 is adapted to fit said stock 1 just below the first shoulder 2 and to extend down along said stock 1. The marking edge of said tool 4, which may be as wide as desired just above the said point, is secured to each side of said stock 1 by a bolt 5 and nut 6, passing through the holes in said tool 4 and said stock 1 at a suitable distance from the top of said tool 4 and said shoulder 2. The top of said tool 4 is rounded to allow said tool 4 to move laterally. At a suitable distance above the smaller end of said stock 1 is a slot 7 through said stock 1, and through said tool 4, registering with said slot 7, are holes 8. Through the slot 7 and holes 8 a bolt 9, screw-threaded on each end, passes, and nuts 10 are screwed on said bolt 9, one on each side of said tool 4. The bolt 9 has its middle part rectangular and adapted to move in the slot 7. Instead of said slot 7, holes 8, bolt 9, and nuts 10 any other means may be used to set said tool 4. The lateral adjustment of said tool 4 is effected by a screw 11, passing through the stock 1 and working in the rectangular part of the bolt 9. A small blade 12, the length of the edge of which is just one-half the width of tool 4, may be attached to the inside of each tool 4. The small blade 12 is secured to tool 4 by a bolt 13, passing through said blade 12 about the middle of said blade 12 and through said tool 4 at a suitable distance from the cutting edge and near the middle of said tool 4, and a nut 14. The bolt-hole in said small blade 12 is countersunk on the inner side of said blade 12, the bottom of said sink being inclined lengthwise said blade 12. The top of the outer end of said blade 12 bears against pins 15 or other suitable devices fixed to the inside of said tool 4. A thumb-screw 16 near the outer edge of said tool 4 bears against the face of said blade 12 intermediate its width and near the outer end of the edged part and permits the adjustment of the edge of said small blade 12 at any desired angle to said tool 4. Blades 17, having cutting edges of any desired shape, may be similarly attached to the inside of said tool 4 for the purpose of marking patterns, blades 12 being in that case left off.

The operation of my invention is as follows: Having set the cogs in the mortises and secured them there and marked the pitch-line and having set the blade 12 at the desired angle, or, if necessary on account of the shape the cogs are desired to have, having substituted blades 17, with properly-shaped cutting edge, the point of the pin 3 is placed on the pitch-line at the center of the cog and the tool 4 adjusted so that its inner edges will be against the rim of the wheel and so that the distance between them will be equal to the width it is desired the cogs shall have. The head of stock 1 is struck smartly with a hammer or mallet, and the marking edge of the blades mark the outline of the cogs. The outlines of the cogs can now be rapidly marked off, and much of the time and labor now required to perform this work will be saved.

Having now described my invention, what I claim as new, and desire to secure by Letters Patent, is—

1. A marking-tool consisting of a stock, having a point at one end, and a tool on each side of said stock, said tools provided just above the point on said stock with symmetric end edges of a substantial extent having the contour of the respective tooth-profiles and adapted to mark the outlines of the cogs in a mortise-wheel, substantially as shown and described.

2. A marking-tool consisting of a stock, having a point at one end, and two tools, one on each side of said stock, said tools provided just above the point on said stock with symmetric end edges of a substantial extent having the contour of the respective tooth-profiles, and means for moving said tools to or from each other and laterally with reference to said stock, substantially as shown and described.

3. A marking-tool consisting of a stock, a tool attached to each side of said stock and extending down alongside of said stock to just above its end, said tools provided with symmetric end edges of a substantial extent having the contour of the respective tooth-profiles, and a small blade attached to the inner side of each of said tools, substantially as shown and described.

4. A marking-tool consisting of a stock, two tools, one on each side of said stock said tools provided with parallel straight edges just above the end of said stock and a small blade attached to the inner side of each of said tools at their lower ends, substantially as shown and described.

5. A marking-tool consisting of a stock, two tools, one on each side of said stock, said tools provided with parallel straight edges just above the lower end of said stock and a small blade attached to the inner side of each of said tools, the cutting edge at an angle to the lower edges of said tools, substantially as shown and described.

6. A tool adapted to mark the outlines of the cogs in a mortise-wheel and consisting of a rectangular stock provided on each side with two shoulders formed by reducing the thickness of said stock and at the end with a point, a tool adapted to fit on each side of said stock, the top of said tool rounded and just under the upper shoulder on said stock, and secured to said stock near the top of said tool and the bottom, or marking edge, of said tool, just above said point, said tool provided with a hole at a suitable distance from the marking edge, a screw-threaded bolt provided with a rectangular middle part, passing through said holes and a slot in said stock, said bolt provided with nuts on each side of said tools, an adjusting-screw passing through said stock and working in said rectangular part of said bolt, a small blade secured to the inside of each of said larger tools, said small blade having an edge only half as long as said larger tools, the bolt-hole on the inner surface of said small blade being countersunk, the upper end of said small blade bearing against pins set in the inner face of said larger tool, and a thumb-screw through said larger tool adapted to bear against the small blade near the outer edge of the edged portion, substantially as shown and described.

In testimony whereof I hereto affix my signature in the presence of two witnesses.

JAMES N. GROVE.

Witnesses:
G. F. KLINEFELTER,
O. R. KLINEFELTER.

---

It is hereby certified that in Letters Patent No. 627,411, granted June 20, 1899, upon the application of James N. Grove, of Railroad, Pennsylvania, for an improvement in "Tools for Marking Cogs in Mortise-Wheels," errors appear in the printed specification requiring correction, as follows: On page 1, lines 6 and 9, the words "Making" should read *Marking;* same page, line 21, the word "views" should read *figures;* line 35, the word "is" should be stricken out; line 37, the period after the reference-figure "1" should be stricken out and a comma inserted and the following word "the" should begin with a small "t" thus making a continuous sentence; lines 48, 52, 56, 57, and 93, the word "tool" should read *tools;* and line 93, the word "its" should read *their;* and that the said Letters Patent should be read with these corrections therein that the same may conform to the record of the case in the Patent Office.

Signed, countersigned, and sealed this 29th day of August, A. D., 1899.

[SEAL.]

WEBSTER DAVIS,
*Assistant Secretary of the Interior.*

Countersigned:
A. P. GREELEY,
*Acting Commissioner of Patents.*

Corrections in Letters Patent No. 627,411.

It is hereby certified that in Letters Patent No. 627,411, granted June 20, 1899, upon the application of James N. Grove, of Railroad, Pennsylvania, for an improvement in "Tools for Marking Cogs in Mortise-Wheels," errors appear in the printed specification requiring correction, as follows: On page 1, lines 6 and 9, the words "Making" should read *Marking;* same page, line 21, the word "views" should read *figures;* line 35, the word "is" should be stricken out; line 37, the period after the reference-figure "1" should be stricken out and a comma inserted and the following word "the" should begin with a small "t" thus making a continuous sentence; lines 48, 52, 56, 57, and 93, the word "tool" should read *tools;* and line 93, the word "its" should read *their;* and that the said Letters Patent should be read with these corrections therein that the same may conform to the record of the case in the Patent Office.

Signed, countersigned, and sealed this 29th day of August, A. D., 1899.

[SEAL.]

WEBSTER DAVIS,
*Assistant Secretary of the Interior.*

Countersigned:
A. P. GREELEY,
*Acting Commissioner of Patents.*